United States Patent
Lee (10) Patent No.: US 7,357,245 B2
(45) Date of Patent: Apr. 15, 2008

(54) CHAIN-TYPE CONVEYOR HAVING DIRECTION-CHANGING ROLLER

(75) Inventor: Sang Su Lee, Ulsan (KR)

(73) Assignee: Myung Wha Machinery Co., Ltd., Kyungju (KR)

( * ) Notice: Subject to any disclaimer, the term of this patent is extended or adjusted under 35 U.S.C. 154(b) by 0 days.

(21) Appl. No.: 11/430,444

(22) Filed: May 8, 2006

(65) Prior Publication Data

US 2006/0254883 A1   Nov. 16, 2006

(30) Foreign Application Priority Data

May 10, 2005   (KR)   ................ 20-2005-0013024

(51) Int. Cl.
*B65G 39/20*   (2006.01)

(52) U.S. Cl. .................. 198/778; 198/370.09

(58) Field of Classification Search ............... 198/778, 198/307.03, 370.08, 370.09
See application file for complete search history.

(56) References Cited

U.S. PATENT DOCUMENTS

| | | | | | |
|---|---|---|---|---|---|
| 2,554,038 | A | * | 5/1951 | Lemmon | 198/779 |
| 3,093,236 | A | * | 6/1963 | McLaughlin | 198/370.08 |
| 3,237,755 | A | * | 3/1966 | Weihe, Jr. | 198/779 |
| 3,550,756 | A | * | 12/1970 | Kornylak | 198/637 |
| 3,608,713 | A | * | 9/1971 | Crosby et al. | 209/583 |
| 4,850,471 | A | * | 7/1989 | Annas et al. | 198/349.3 |
| 5,655,643 | A | * | 8/1997 | Bonnet | 198/370.08 |
| 6,168,011 | B1 | * | 1/2001 | Morsbach | 198/779 |
| 6,536,580 | B1 | * | 3/2003 | Fritzsche | 198/370.07 |
| 6,571,937 | B1 | * | 6/2003 | Costanzo et al. | 198/779 |
| 6,974,020 | B1 | * | 12/2005 | Peppel | 198/370.07 |
| 7,124,876 | B2 | * | 10/2006 | Wolf | 198/370.08 |
| 2005/0109582 | A1 | * | 5/2005 | Fourney | 198/779 |
| 2006/0032727 | A1 | * | 2/2006 | Burch | 198/416 |
| 2006/0070856 | A1 | * | 4/2006 | Stebnicki et al. | 198/779 |
| 2006/0249354 | A1 | * | 11/2006 | Riddick et al. | 198/779 |

* cited by examiner

*Primary Examiner*—Mark A. Deuble
(74) *Attorney, Agent, or Firm*—Ladas & Parry LLP

(57) ABSTRACT

Disclosed is a chain-type conveyor having a direction-changing roller capable of easily changing the orientation of an article to continuously transfer the article, without using any separate direction-changing unit at a corner part of the conveyor, in the case in which the transfer direction of the article has to be changed during the transfer of the article by a conveyor, thereby reducing a cost of the article and usefully utilizing a limited space. The chain-type conveyor for transferring an article in a straight direction when the chain-type conveyor is driven by driving means includes a plurality of chain plates foldably connected to each other, a pair of brackets each having a lower portion symmetrically fixed to an outer surface of the chain plate in a front/rear direction and an inclined upper portion, and direction-changing rollers rotatably coupled to the brackets in a diagonal direction and changing a transfer direction of the article, which is transferred along a roller-type conveyor and then stopped by a stopper roller rotatably installed to a front portion of the chain-type conveyor, by a rotational force generated by friction between the article and the direction-changing roller.

15 Claims, 8 Drawing Sheets

CHAIN-TYPE CONVEYOR HAVING DIRECTION-CHANGING ROLLER

CROSS-REFERENCE TO RELATED APPLICATION

This application is based on and claims priority from Korean Patent Application No. 20-2005-13024, filed on May 10, 2005, the disclosure of which is incorporated herein in its entirety by reference.

BACKGROUND OF THE INVENTION

1. Field of the Invention

The present invention relates to a chain-type conveyor having a direction-changing roller capable of easily changing the travel direction of an article to continuously transfer the article, without using any separate direction-changing unit (i.e., lifter) at a corner part of the conveyor, in the case in which the transfer direction of the article has to be changed during the transfer of the article by a conveyor.

More particularly, the present invention relates to a chain-type conveyor having a direction-changing roller capable of transferring an article in a straight direction by the travel (track motion) of the chain-type conveyor in a straight moving section (entry section) and changing the transfer direction of the article by the rotational force generated by friction between the article and the direction-changing roller, which is mounted on the chain-type conveyor and is rotated in a diagonal direction, in a direction changing section (corner part), without using separate lifting means, thereby reducing a cost of the article and usefully utilizing a space.

2. Description of the Prior Art

An endless conveyor belt or conveyor roller is generally used to continuously transfer articles for each unit process in loading/unloading work or on production lines. In this case, it is necessary to change the transfer direction of the article, for example, at a right angle, due to the spatial feature of a workplace or the convenience of work.

To this end, a pair of conveyors are arranged in such a way that the conveyors are oriented at a right angle, and a separate direction-changing unit (e.g., lifter, conveying device, or the like) for the article should be provided to the corner part of the conveyor, so as to continuously transfer the articles. Thus, there are some problems that a limited space of the workplace cannot be not effectively used and that the maintenance should be required for the separate direction-changing unit, which increases the cost of the article.

SUMMARY OF THE INVENTION

Accordingly, the present invention has been made to solve the above-mentioned problems occurring in the prior art, and an object of the present invention is to provide a chain-type conveyor having a direction-changing roller capable of easily changing the orientation of an article to continuously transfer the article, without using any separate direction-changing unit at a corner part of the conveyor, in the case in which the transfer direction of the article has to be changed during the transfer of the article by a conveyor, thereby reducing a cost of the article and efficiently utilizing a limited space.

Another object of the present invention is to provide a chain-type conveyor having a direction-changing roller which is mounted on the chain-type conveyor and rotated in a diagonal direction to change the transfer direction of an article by a rotational force generated by friction between the article and the direction-changing roller.

Still another object of the present invention is to provide a chain-type conveyor having a direction-changing roller which can be easily assembled due to a simple structure thereof, increase a frictional force against an article to easily change the transfer direction of the article, and prevent the article from escaping from the conveyor.

Still another object of the present invention is to provide a chain-type conveyor having a direction-changing roller which can transfer a heavy weight article or large article, because of the improved durability thereof.

Still another object of the present invention is to provide a chain-type conveyor having a direction-changing roller and a side roller for preventing the slack of a chain, thereby improving durability of the chain and smoothly transferring an article.

In order to accomplish these objects, according to one aspect of the present invention, there is provided a chain-type conveyor for transferring an article in a straight direction when the chain-type conveyor is driven by driving means, which includes a plurality of chain plates foldably connected to each other, a pair of brackets each having a lower portion symmetrically fixed to an outer surface of the chain plate in a front/rear direction and an inclined upper portion, and direction-changing rollers rotatably coupled to the brackets in a diagonal direction and changing a transfer direction of the article, which is transferred along a roller-type conveyor and then stopped by a stopper roller rotatably installed to a front portion of the chain-type conveyor, by a rotational force generated by friction between the article and the direction-changing roller.

In a preferred embodiment, the chain plates for supporting the bracket to which the direction-changing rollers are installed in multiple rows.

The stopper roller may comprise an idle roller and a drive roller rotated by driving means.

Preferably, the direction-changing roller is installed at an angle of 45 degrees in a diagonal direction.

An embossed portion may be formed on an outer periphery of the direction-changing roller, so as to increase the friction between the article and the direction-changing roller.

The chain-type conveyor may further comprise side rollers rotatably coupled to both ends of the fixing pin for preventing slack of the chain when the conveyer is driven.

Also, the chain-type conveyor may further comprise a guide mounted on an outside of the chain-type conveyer for preventing the article from being dropped from the chain-type conveyor when the article is turned by rotation of the direction-changing roller.

The side rollers are mounted by maintaining an interval between two links.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description and drawings, the same reference numerals are used to designate the same or similar components, and so repetition of the description on the same or similar components will be omitted.

As shown in FIGS. 1 through 10, a chain-type conveyor 20 for transferring an article W (e.g., pallet or packaged product) in a straight direction when the chain-type conveyor is driven (track motion) by driving means (e.g., driving motor) according to the present invention includes a chain-type conveyor 20 includes a plurality of chain plates 10 foldably connected to each other by a fixing pin 90, a pair of brackets 40 having a lower portion symmetrically fixed to an outer surface of the chain plate 10 in a front/rear direction by the fixing pin 90 and an inclined upper portion (holding portion 30) (bent at an angle of 45 degrees in a diagonal direction), and direction-changing rollers 70, 70A, and 70B rotatably coupled to the brackets 40 at an angle of 45 degrees in a diagonal direction by the fixing pin 90 and changing a transfer direction of the article W, which is transferred along a roller-type conveyor 50 and stopped by a stopper roller 60 rotatably installed to a front portion of the chain-type conveyor 20, at a right angle by a rotational force generated by friction between the article and the direction-changing roller.

In this case, the stopper roller 60 may include an idle roller which does not require separate driving means, and a drive roller rotated by separate driving means (e.g., chain).

Reference numeral 20a indicates a chain rail for guiding the track motion of the chain-type conveyor 20, 100 indicates a guide for preventing the article W from being dropped from the chain-type conveyor 20 when the article is turned by rotation of the direction-changing roller 70 mounted on the chain-type conveyor 20, 110 indicates a sprocket for rotating the chain-type conveyor 20, and 120 indicates a plate for rotatably supporting the stopper roller 60.

Operation of the chain-type conveyor having the direction-changing roller according to the present invention will now be described with reference to the accompanying drawings.

Figure 1:
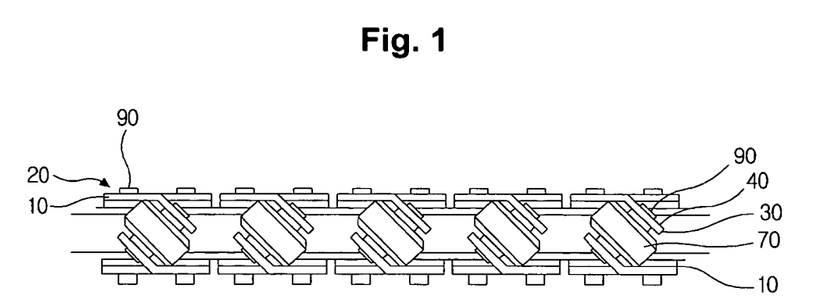
FIG. 1 is a view illustrating a chain-type conveyor having a direction-changing roller (for turning an article leftward) according to the present invention.
Figure 2:
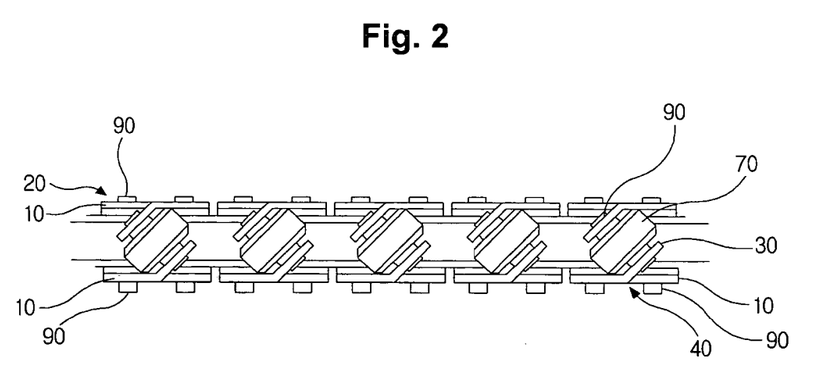
FIG. 2 is a view illustrating a chain-type conveyor having a direction-changing roller (for turning an article rightward) according to the present invention.
Figure 3:
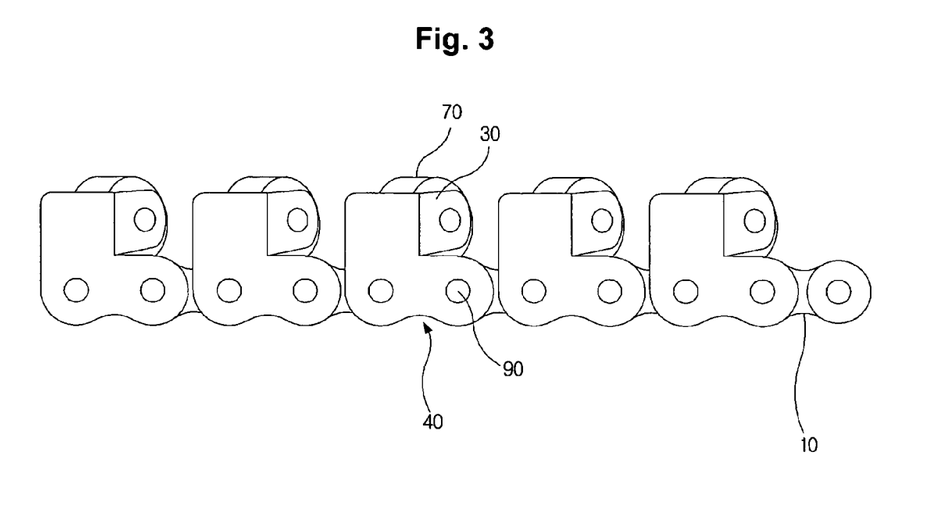
FIG. 3 is a front view of the roller in FIG. 2.
Figure 4:
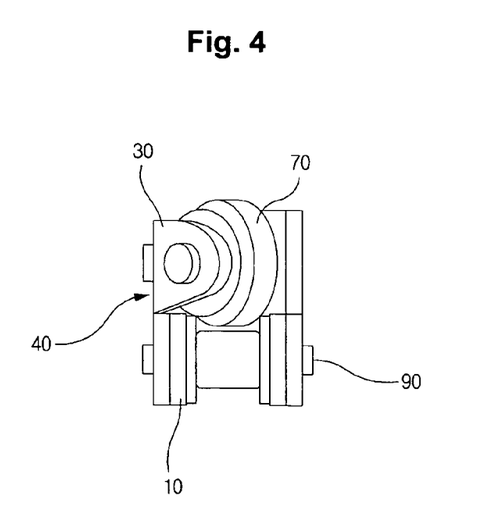
FIG. 4 is a side view of the roller in FIG. 2.
Figure 10:
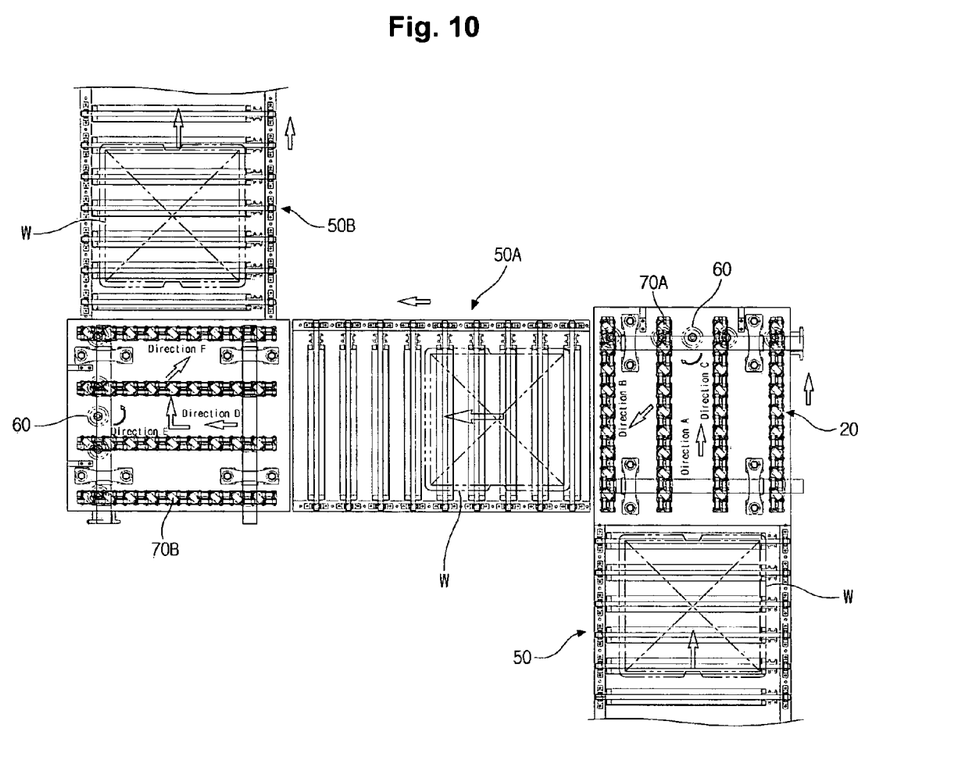
FIG. 10 is a view illustrating the application of a chain-type conveyor having a direction-changing roller according to the present invention.

FIG. 1 is a view illustrating the chain-type conveyor having the direction-changing roller 70A (for turning the article leftward) according to the present invention, FIG. 2 is a view illustrating a chain-type conveyor having the direction-changing roller 70B (for turning an article rightward) according to the present invention, and FIG. 10 is a view illustrating the application of the chain-type conveyor having the direction-changing roller according to the present invention.

As shown in FIG. 10, the article W seated on the roller conveyor 50 is transferred in a straight direction by the driving means (not shown), and is continuously transferred (indicated by arrow A) in the straight direction by the chain-type conveyor 20 (arranged in four rows). In this case, the direction-changing roller 70A (for turning the article leftward) rotatably mounted on the chain-type conveyor 20 is stopped.

The article W transferred to an end portion of the chain-type conveyor 20 is stopped by the stopper rollers 60 (five in FIGS. 9 and 10) rotatably installed to the front portion of the chain-type conveyor 20, and, at that time, since the chain-type conveyor 20 is continuously driven, the stopper rollers 60 are rotated in a clockwise direction (indicated by arrow C) by the rotational force generated by friction between the article and the direction-changing roller 70A.

Also, since the direction-changing roller 70A rotatably coupled to the brackets 40 of the chain-type conveyor 20 is rotated in the direction indicated by arrow B (from a right upper end to a left lower end in FIG. 10), the article W is turned at a right angle with respect to an initial entry direction of the chain-type conveyor 20, and is then transferred to the roller conveyor 50A.

As shown in FIG. 10, the article W transferred along the roller conveyor 50 is turned leftward by operation of the chain-type conveyor 20 having the direction-changing roller 70A (for turning the article leftward), and is then transferred in a left direction along the roller conveyor 50A. After the article W transferred in the straight direction along the roller conveyor 50A is turned rightward by operation of the chain-type conveyor 20 having the direction-changing roller 70B (for turning the article rightward), and is then transferred in a right direction, the article W is transferred in the straight direction along the roller conveyor 50B.

More specifically, the article W entering into the chain-type conveyor 20 by operation of the roller conveyor 50A is transferred in the direction indicated by arrow D by operation of the chain-type conveyor 20. In this case, the direction-changing roller 70B (for turning the article rightward) rotatably mounted on the chain-type conveyor 20 is stopped.

The article W transferred to the end portion of the chain-type conveyor 20 is not further moved in the straight direction by the stopper rollers 60 (five in FIGS. 9 and 10) rotatably installed to the front portion of the chain-type conveyor 20, and, at that time, since the chain-type conveyor 20 is continuously driven by the driving means, the stopper rollers 60 are rotated in an counterclockwise direction (indicated by arrow E) by the rotational force generated by friction between the article and the direction-changing roller 70B.

Also, since the direction-changing roller 70B rotatably coupled to the brackets 40 of the chain-type conveyor 20 is rotated in the direction indicated by arrow F (from the left lower end to the right upper end in FIG. 10), the article W is turned at a right angle with respect to the initial entry direction D of the chain-type conveyor 20, and is then transferred to the roller conveyor 50B.

As described above, in the case in which the article W transferred in the straight direction along the roller conveyors 50 and 50A is turned at a right angle, the article is easily turned by the chain-type conveyor 20 having the direction-changing rollers 70, 70A, and 70B rotatably coupled to the brackets 40 inclined in a diagonal direction, and any separate direction changing unit (e.g., lift and horizontal carrying unit) is not necessary, thereby reducing a cost and effectively utilizing the limited space of a workplace.

Figure 5:
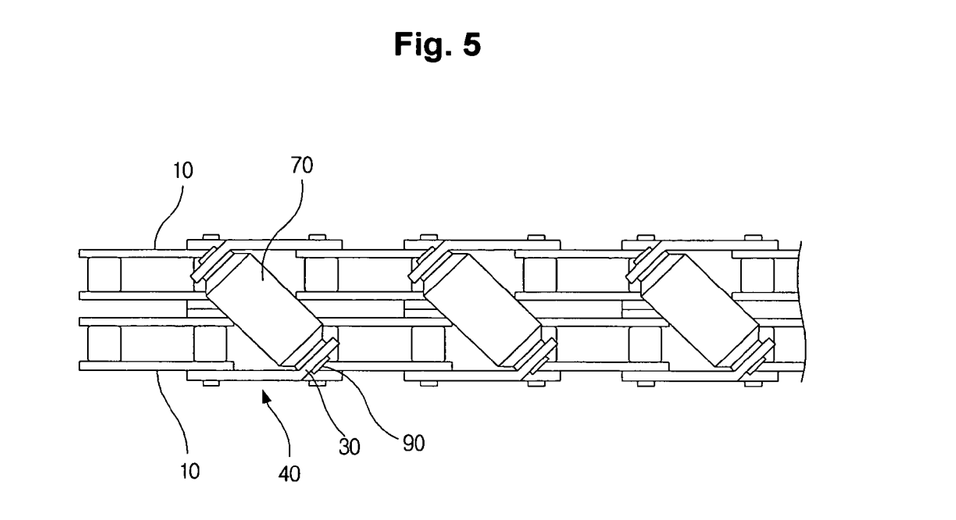
FIG. 5 is a view illustrating a chain-type conveyor according to an alternative embodiment of the present invention.
Figure 6:
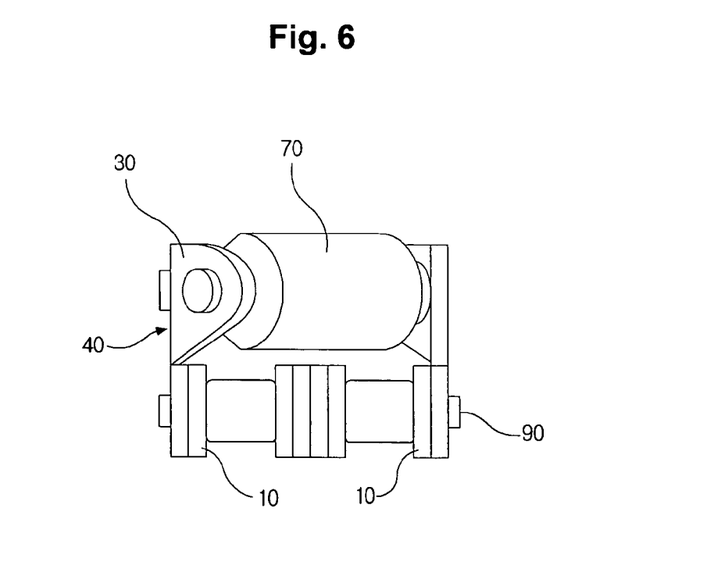
FIG. 6 is a side view of the roller in FIG. 5.

As shown in FIGS. 5 and 6, in the chain-type conveyor having the direction-changing roller according to the present invention, the chain plates 10 for supporting the bracket 40 to which the direction-changing rollers 70 are installed in multiple rows, and the size of the direction-changing roller 70 is enlarged to increase a contact area between the direction-changing roller and the article. Therefore, the durability is improved, and thus a heavy weight article or large article can be transferred. Also, it can prevent the direction-changing roller 70 from being damaged or ruptured to minimize the maintenance thereof.

Figure 7:
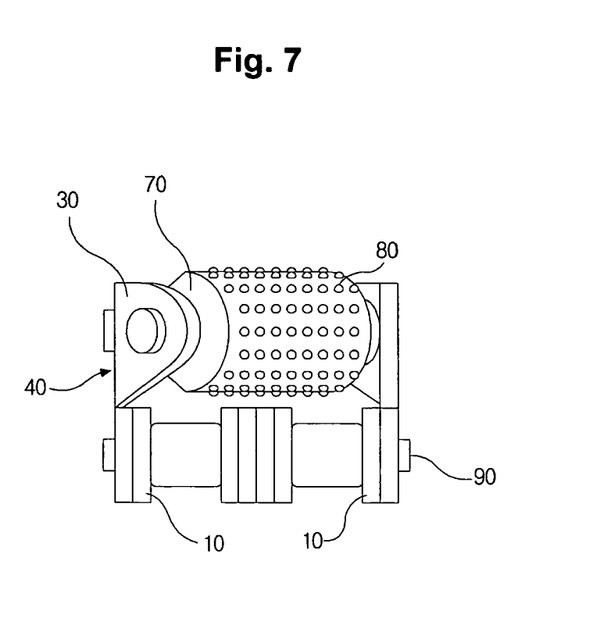
FIG. 7 is a view illustrating a roller mounted on a chain-type conveyor according to an alternative embodiment of the present invention.
Figure 8:
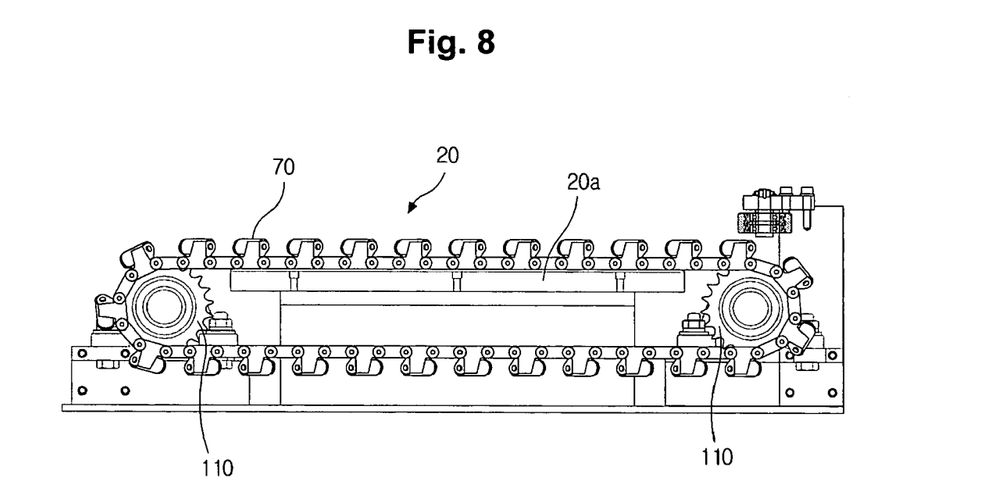
FIG. 8 is a side view of chain-type conveyor according to the present invention roller.
Figure 9:
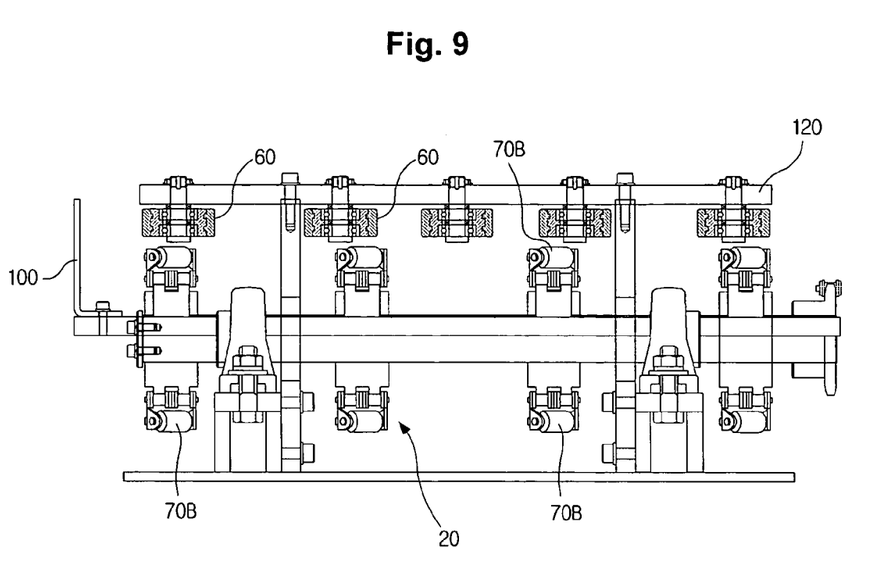
FIG. 9 is a view illustrating a corner part of a chain-type conveyor according to the present invention.

In addition, as shown in FIG. 7, in the chain-type conveyor having the direction-changing roller according to the present invention, an embossed portion 80 is formed on an outer periphery of the direction-changing roller 70, so as to increase the friction between the article W and the direction-changing roller 70. Therefore, the direction change of the article W is convenient, and it can prevent the article W from being dropped from the chain-type conveyor 20.

Figure 11:
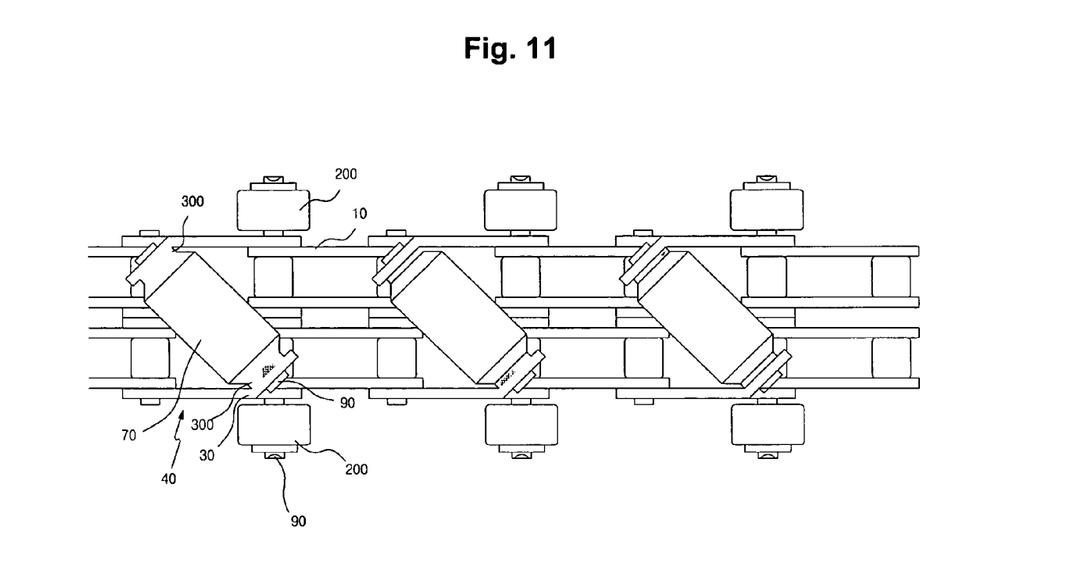
FIG. 11 is a view illustrating a chain-type conveyor according to an alternative embodiment of the present invention.
Figure 12:
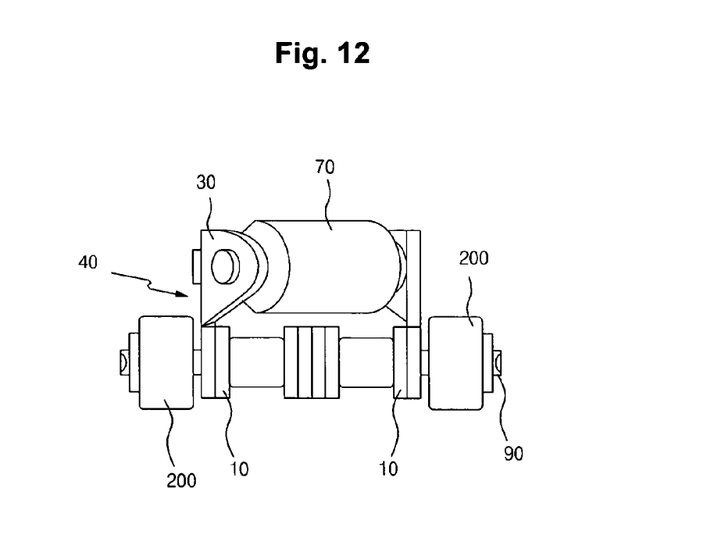
FIG. 12 is a side view of the chain-type conveyor in FIG. 11.
Figure 13:
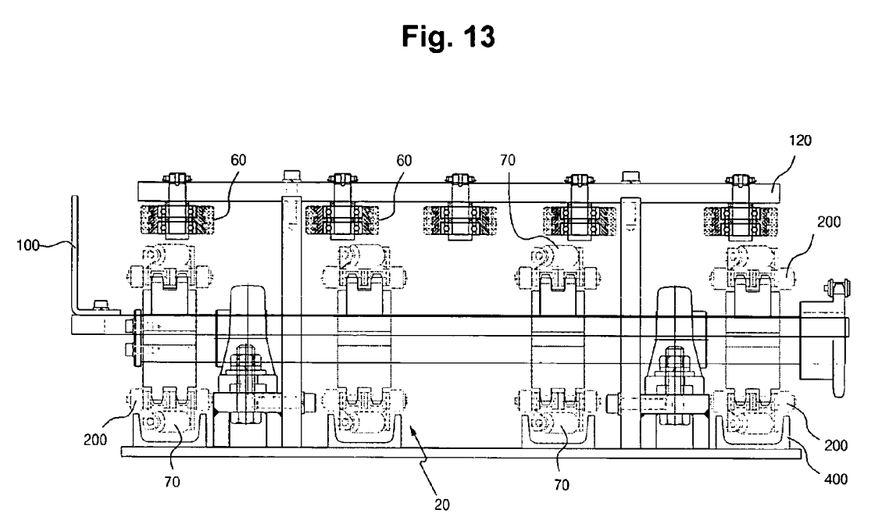
FIG. 13 is a view illustrating the corner part of the chain-type conveyor in FIG. 11.

Referring to FIGS. 11 through 13, according to the chain-type conveyor, the direction-changing roller 70 is rotatably coupled to the holding portion 30 of the bracket 40 by the fixing pin 90 which fixes the bracket 40 to the chain plate 10, and side rollers 200 are rotatably coupled to both ends of the fixing pin 90 to prevent the slack of the chain when the conveyer is driven. In this case, the side rollers 200 may be mounted by maintaining an interval between two links.

Reference numeral 300 denotes a bushing, and 400 denotes a support for supporting the side roller 200 to prevent the slack of the chain when the conveyer is driven.

The construction of this embodiment is substantially identical to that as shown in FIG. 5, except for the side rollers 200 coupled to both ends of the fixing pin 90. Therefore, the detailed description on the structure and operation thereof will be omitted herein, in which like elements are denoted by the same reference numerals.

With the construction as shown in FIGS. 11 through 13, the slack of the chain can be prevented by the side rollers 200 when the conveyer is driven, so that the tension of the chain is maintained at an initial level to improve the durability and smoothly transfer the article.

As the abode description, the chain-type conveyor having the direction-changing roller according to the present invention has the following advantages.

In the case in which the transfer direction of the article has to be changed at a corner part of the conveyor during the transfer of the article by the conveyor, it is not required for separate direction-changing unit. Therefore, since the operating time is shortened, the operating efficiency is improved and the cost of the article is reduced. Also, the limited space is effectively utilized.

In addition, since the structure of the direction-changing roller mounted on the chain-type conveyor is simple, the assembly and operation thereof can be improved, and it can be manufactured in mass. Also, the article can be easily turned by the increased frictional force between the direction-changing roller and the article, and it can prevent the article from being dropped from the chain-type conveyor.

Also, since the durability is improved, the heavy weight article or large article can be transferred. Also, it can prevent the direction-changing roller 70 from being damaged or ruptured to minimize the maintenance thereof.

Also, the slack of the chain can be prevented by the side rollers when the conveyer is driven, thereby improving the durability and smoothly transferring the article.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A conveyor system comprising:
   a first conveyor configured to transfer an article in a first direction;
   a plurality of parallel chain conveyors configured to receive the article from the first conveyor, each chain conveyor comprising:
      a plurality of chain link units rotationally connected with each other to form a closed loop, each chain link unit comprising two connected diametrically opposed plates rotatably supporting a roller therebetween to rotate about an axis diagonal to the plates and further defining a space therebetween to receive a tooth of a sprocket, the friction between the article and the rollers causing the article to travel in a second direction when the article is stopped from being transferred in the first direction while the plurality of chain conveyors are moving;
   a sprocket driving means for moving the plurality of chain conveyors in the first direction by engaging its teeth with the chain link units through the space in each chain link unit; and
   a stop roller configured to stop the article from being transferred in the first direction by the plurality of chain conveyors.

2. The chain conveyor of claim 1, wherein the two diametrically opposed plates are interconnected by a first pin.

3. The chain conveyor of claim 2, wherein the roller is rotatably supported between the two diametrically opposed plates by a second pin.

4. The chain conveyor of claim 1, wherein the roller is rotatably supported between the two diametrically opposed plates by a second pin.

5. The chain conveyor of claim 1, wherein the axis is at an angle of 45 degrees to the plates.

6. The chain conveyor of claim 2, wherein at least one chain link unit further comprises a pair of side rollers coupled to the first pin for preventing slack when the chain conveyor is driven by the sprocket.

7. A conveyor system comprising:
   a plurality of parallel chain conveyors configured to transfer an article in a first direction, each chain conveyor comprising:
      a plurality of chain link units rotationally connected with each other to form a closed loop, each chain link unit comprising two connected diametrically opposed plates rotatably supporting a roller therebetween to rotate about an axis diagonal to the plates and further defining a space therebetween to receive a tooth of a sprocket, the friction between the article and the rollers causing the article to travel in a second direction when the article is being stopped from transferring in the first direction while the plurality of chain conveyors are moving; and a stop roller configured to stop the article from being transferred in the first direction by the plurality of chain conveyors.

8. The chain conveyor of claim 7, wherein the two diametrically opposed plates are interconnected by a first pin.

9. The chain conveyor of claim 8, wherein the roller is rotatably supported between the two diametrically opposed plates by a second pin.

10. The chain conveyor of claim 7, wherein the roller is rotatably supported between the two diametrically opposed plates by a second pin.

11. The chain conveyor of claim 7, wherein the axis is at an angle of 45 degrees to the plates.

12. The chain conveyor of claim 8, wherein at least one chain link unit further comprises a pair of side rollers coupled to the first pin for preventing slack when the chain conveyor is driven by the sprocket.

13. The chain conveyor of claim 7, further comprising a sprocket driving means for moving the plurality of chain conveyors in the first direction.

14. A chain conveyor comprising:

a plurality of chain link units rotationally connected with each other to form a closed loop, each chain link unit comprising two connected diametrically opposed plates rotatably supporting a roller therebetween to rotate about an axis diagonal to the plates and further defining a space therebetween to receive a tooth of a sprocket.

15. The chain conveyor of claim 14, wherein:

the plurality of chain link units rotationally connected with each other form a closed loop in a first plane; the two connected diametrically opposed plates of each chain link unit being substantially parallel plates; and the axis of the roller rotatably supported therebetween being an axis perpendicular to a second plane diagonal to the first plane.

* * * * *